US006359560B1

United States Patent
Budge et al.

(10) Patent No.: US 6,359,560 B1
(45) Date of Patent: Mar. 19, 2002

(54) COMPUTER SYSTEM WITH MOTION-TRIGGERED ALARM PROCEDURE

(75) Inventors: Daniel C. Budge, Tualtin, OR (US); Paul Long, Austin, TX (US); Eric Peterson, Portland; Mark Armour, Corvallis, both of OR (US); David P. Sperling, Laguna Niguel; Robert W. Scheussler, Yorba Linda, both of CA (US)

(73) Assignee: Smith Micro Software, Aliso Viejo, CA (US)

(*) Notice: Subject to any disclaimer, the term of this patent is extended or adjusted under 35 U.S.C. 154(b) by 0 days.

(21) Appl. No.: 09/439,639

(22) Filed: Nov. 12, 1999

Related U.S. Application Data

(60) Provisional application No. 60/107,985, filed on Nov. 12, 1998.

(51) Int. Cl.[7] ................................................. G08B 13/00
(52) U.S. Cl. .................. 340/541; 340/506; 340/825.06; 340/565; 358/135; 358/136
(58) Field of Search ................................. 358/135, 136; 340/506, 507, 541, 565, 825.06

(56) References Cited

U.S. PATENT DOCUMENTS 4,827,338 A  5/1989  Gérard ...................... 358/136
5,400,246 A * 3/1995  Wilson et al. ......... 340/825.06 X

FOREIGN PATENT DOCUMENTS

FR  2 589 020  10/1985
FR  2 713 806  12/1993

* cited by examiner

Primary Examiner—Daryl Pope
(74) Attorney, Agent, or Firm—Knobbe, Martens, Olson & Bear LLP

(57) ABSTRACT

A computer system includes a video input device that generates video data representing a field of view in front of the video input device. The computer system further includes a buffer and a video processing module. The buffer is configured to record a video clip of the field of view in front of the video input device. The video processing module is connected to the buffer and the video input device. The video processing module includes a video capture device to encode the video data, and a signal processing module. The signal processing module processes the encoded video data in order to calculate an average value of the video data indicative of motion within the field of view in front of the video input device. The signal processing module generates an alarm if the average value is above a predetermined threshold value.

40 Claims, 8 Drawing Sheets

COMPUTER SYSTEM WITH MOTION-TRIGGERED ALARM PROCEDURE

RELATED APPLICATION

This application claims the benefit of priority under 35 U.S.C. 119(e) of U.S. Provisional Application No. 60/107,985, filed Nov. 12, 1998.

BACKGROUND OF THE INVENTION

1. Field of the Invention

The invention relates to a computer system. More particularly, the invention relates to a computer system configured to detect motion.

2. Description of the Related Art

An example of a computer system includes a conventional computer having conventional computer electronics, such as a central processing unit (CPU), a hard disc drive, an audio card and a video card. A mouse, a keyboard and a monitor are in most cases considered part of the computer.

Such a computer system typically processes text, graphics, voice or video. Often, the computer system includes a hard disc drive to handle the large amounts of data involved in these interactions. In addition, depending on the user's specific applications, the computer system can be further connected to loudspeakers, a microphone and to a video camera. Conventional sound and video cards within the computer allow operation of these additionally connected devices.

Conventional computer systems often have an interface (e.g., a modem, network connection), that allows the user to send and receive electronic mail (e-mail) via a local network or the INTERNET. For instance, the computer system may be configured to "surf" the INTERNET, make telephone calls, send individual pictures, video clips, or play music from radio stations around the world.

When a user is not using the computer system, the computer system is switched off or running in an idle or stand-by mode. In the idle or stand-by mode, conventional computer systems typically display screen savers or perform other tasks that require a small fraction of the computer system's performance. An example of such a task is waiting for incoming electronic mail or facsimiles.

SUMMARY OF THE INVENTION

In one embodiment, the invention uses the time when a user is away from a computer system to perform video surveillance of a viewing area. In other embodiments, the invention performs video surveillance of a viewing area as specified by a user. In particular, the invention uses video technology in a novel way to detect motion in a viewing area. Once the invention detects motion, embodiments of the invention can also perform a variety of predefined activities. For example, when motion occurs in a viewing area, the invention product can record the viewing area for security purposes, signal an alarm or notify a remote location.

In one embodiment, a video camera is connected to a video processing system. The video processing system converts the video data from the camera to encoded video segments that generally vary in size based on the amount of motion in the video camera's field of view.

A processor averages the video segments to determine when sufficient motion exists in the field of view. In one embodiment, the processor calculates a weighted average which places greater emphasis on the more recent video segments. The processor then compares the weighted average to a threshold to determine when sufficient motion exists in the field of view.

In one embodiment of the present invention, a conventional video camera and a computer can be used as a security or monitoring system. This computer system is triggered by motion detected in front of the video camera. Once triggered, the computer system records both a video clip and sound, and can trigger an alarm or a notification. For example, a working parent can use the computer to receive an automatic notification that the children have returned home from school safely. Alternatively, an office worker can use the computer to determine who was looking for him while he was away from his desks. Under certain circumstances, the user may connect the system directly to the police or a private security system.

One aspect of the invention relates to a motion-detection system that detects motion in a field of view. The motion-detection system is configured to process encoded video data about the field of view to determine when sufficient motion exists in the field of view. The motion-detection system comprises a video camera that generates a series of video frames that represents a field of view in front of the video device.

The motion-detection system further comprising a video encoder in communication with the video frames. The video encoder is configured to process the video frames to generate encoded video frames wherein the size of the encoded video frames vary based on the amount of motion in the field of view.

A computer is in communication with the encoded video frames, the computer comprising a threshold value stored in a computer accessible storage medium. The computer further comprising a processor in communication with the encoded video data and the threshold value. The processor is configured to process the encoded video frames to determine a weighted average of at least a portion of the encoded video frames. The processor is further configured to detect motion when the weighted average exceeds the threshold value.

Another aspect of the invention relates to a motion-detection apparatus that comprises a series of video segments configured to vary in size based on movement in a field of view. The motion-detection apparatus further comprises a processor configured to process at least a portion of the video segments to determine an average. The processor is further configured to detect motion when the average exceeds a threshold.

Another aspect of the invention relates to an article of manufacture comprising a signal processing module stored in a computer accessible storage media and executable by a processor. The signal processing module is configured to calculate an average of multiple video segments that vary in size based on movement in a field of view. The signal processing module is further configured to detect motion when the average exceeds a threshold.

An additional aspect of the invention relates to a motion-detection apparatus that comprises a series of video segments configured to vary in size based on movement in a field of view. The motion-detection apparatus fierier comprises a means for processing at least a portion of the video segments to determine an average. The means also detecting motion when the average exceeds a threshold.

Another aspect of the invention relates to a method of detecting motion comprising the act of generating video data that represent a field of view and encoding the video data to generate encoded video segments that vary in size based on the amount of motion in the field of view. The method also comprising the acts of determining a weighted average of at least a portion of the encoded video segments and detecting motion when the weighted average equals or exceeds a threshold.

An additional aspect of the invention relates to a method of detecting motion comprising the act of receiving video segments that vary in size based on movements in a field of view. The method also comprising the act of calculating an average of at least a portion of the video segments. The method further comprising the act of detecting motion when the average exceeds a threshold.

Another aspect of the invention relates to a motion-detection system that transfers video segments stored in a buffer to a computer accessible storage medium when motion is detected in a field of view. The motion-detection system comprises a video camera with a field of view, the video camera configured to generate video data about the field of view.

The motion-detection system further comprising a video encoder configured to process the video data to generate video segments that vary in size based on the amount of motion in the field of view. The motion-detection system further comprising a buffer which stores a portion of the video segments occurring prior to a detection of motion and a portion of the video segments occurring after the detection of motion.

The motion-detection system also comprising a processor configured to locate in the buffer the oldest encrypted video segment which independently defines an image within the field of view. The processor further configured to transfer the oldest encrypted video segment and subsequent encrypted video segments from the buffer to a computer accessible storage medium.

Another aspect of the invention related to a motion-detection apparatus comprising a buffer that stores video segments which vary in size based on movement in a field of view. The motion-detection system further comprising a processor that is configured to locate in the buffer a prior video segment occurring before the detection of motion. The processor is further configured to transfer the prior video segment and subsequent video segments from the buffer to a computer accessible storage medium.

An additional aspect of the invention related to a motion-detection apparatus comprising a first means for temporarily storing video segments which vary in size based on movement in a field of view. The motion-detection apparatus further comprising a second means for locating in the buffer a prior video segment occurring before the detection of motion. The second means transferring the prior video segment and subsequent video segments from the buffer to a computer accessible storage means.

Another aspect of the invention related to an article of manufacture comprising a buffer module stored in a computer accessible storage media and executable in a processor. The buffer module configured to temporarily store video segments which vary in size based on movement in a field of view.

The article of manufacture further comprising a signal processing module stored in a computer accessible storage media and executable in a processor. The signal processing module is configured to locate in the buffer module a prior video segment occurring before the detection of motion. The processor is further configured to transfer the prior video segment and subsequent video segments from the buffer to a computer accessible storage medium.

Another aspect of the invention related to a method of detecting motion comprising the act of generating video data that represent a field of view. The method also comprising the act of encoding the video data to generate encoded video segments that vary in size based on the amount of motion in the field of view. The method further comprising the act of storing in a buffer, at least a portion of the video segments occurring prior to a detection of motion and at least a portion of the video segments occurring after the detection of motion.

The method also comprising the act of locating in the buffer the oldest encrypted video segment which independently defines an image within the field of view. The method further comprising the act of transferring the oldest encrypted video segment and subsequent encrypted video segments from the buffer to a computer accessible storage medium.

An additional aspect of the invention related to a method of storing video data comprising the act of storing in a buffer, video segments which vary in size based on movement in a field of view. The method also comprising the act of locating in the buffer a prior video segment occurring before the detection of motion. The method further comprising the act of transferring the prior video segment and subsequent video segments from the buffer to a computer accessible storage medium.

An aspect of the invention involves a computer system. The computer system includes a video input device to generate video data representing a field of view in front of the video input device, and a computer connected to the video input device. The computer includes a buffer and a video processing module. The buffer is configured to record a video clip of the field of view in front of the video input device. The video processing module is connected to the buffer and the video input device. The video processing module includes a video capture device to encode the video data in consecutive frames of varying size, and a signal processing module. The signal processing module processes the encoded video data in order to calculate an average value of the size of the encoded video data, and to generate an alarm signal if the average value exceeds a predetermined threshold value. The alarm signal indicates that sufficient motion has been detected in front of the video input device.

A further aspect of the invention involves a method for detecting motion with a computer system. Encoded video data is received from a video capture device. The encoded video data represents a field of view in front of a video input device, and includes frames of variable lengths. The length of a frame depends on motion within the field of view. An average value for the variable lengths of the frames is calculated and compared with a predetermined threshold value which defines no motion threshold in the field of view. If the average value is greater than the predetermined threshold value, an alarm signal is generated. The alarm signal indicates that the motion within the field of view is higher than in the no-motion threshold.

Another aspect of the invention involves a video processing module. The video processing module includes a video capture device and a signal processing module. The video capture device is configured to encode video data generated by a video input device. The encoded video data represents a field of view in front of the video input device. The signal processing module is connected to the video capture device and connectable to an interface module and a buffer. The signal processing module is configured to process the encoded video data in order to calculate an average value of the video data indicative of motion within the field of view in front of the video input device. If the average value is above a predetermined threshold value, an alarm signal is generated.

BRIEF DESCRIPTION OF THE DRAWINGS

These and other aspects, advantages, and novel features of the invention will become apparent upon reading the following detailed description and upon reference to the accompanying drawings.

DETAILED DESCRIPTION OF THE PREFERRED EMBODIMENT

Figure 1:
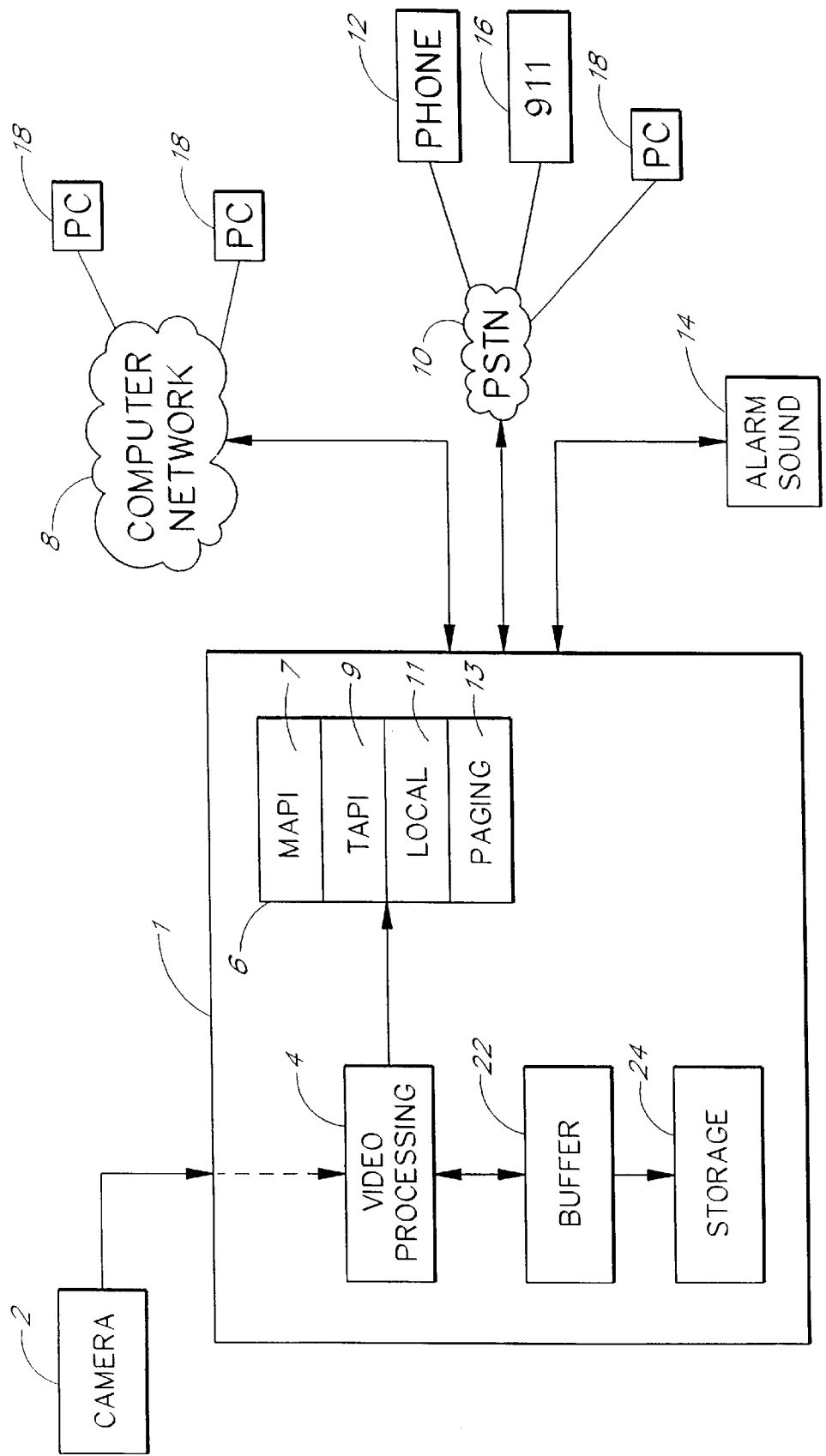
FIG. 1 is a general overview of a communications system comprising a computer system associated with individual communications networks.

FIG. 1 shows a block diagram of a computer 1. In one embodiment, the computer 1 is connected to an external video input device 2. The computer 1 includes conventional computer electronics including a motherboard containing the processor and an associated chip set, a communications bus, a power supply and various interface and drive electronics.

In another embodiment, the computer 1 is a processor configured to perform specific tasks. The computer 1 may have a configuration based on Intel Corporation's family of microprocessors, such as the PENTIUM family and Microsoft Corporation's WINDOWS operating systems such as WINDOWS 95, WINDOWS 98, or WINDOWS NT.

It is contemplated, however, that the computer 1 can be implemented with a wide range of computer platforms using conventional general purpose single chip or multichip microprocessors, digital signal processors, embedded microprocessors, microcontrollers and the like. It is also contemplated that the computer 1 may be implemented with a wide range of operating systems such as Unix, Linux, Microsoft DOS, Macintosh OS, OS/2 and the like.

Although not shown, it is contemplated that in some embodiments, the computer 1 may include a video display (monitor), a keyboard, a mouse, loudspeakers or a microphone. In alternative embodiments, the video input device 2 can also be integrated into a housing of computer.

A user can operate the computer 1 independently, or as a part of a computing system. FIG. 1 illustrates an exemplary application in which the computer 1 is connected to a computer network 8, and a public telephone network 10 (PSTN). Via these networks 8, 10, the computer 1 can communicate with an emergency communication device 16 (indicated as "911"), a telephone 12 (indicated as "PHONE"), or other computers 18 (indicated as "PC"). The emergency communications device 16, the telephone 12 and the computers are usually in the domain of other users. The emergency communications device 16, for example, can be located within an office of a security service or the police.

As illustrated in FIG. 1, the user can also connect an apparatus 14 to the computer 1. The apparatus 14 can be connected to the interface module 6 or a serial or parallel port of the computer 1. The apparatus 14 is configured to indicate a visual or an acoustic alarm signal, or a combination of these alarm signals, at a local or remote location. The apparatus 14 can be located close to the computer 1, for example, within the same room, or at a remote office of a security service. In one embodiment, the optional loudspeakers or the video display may be used as the apparatus 14.

In the illustrated embodiment of an exemplary application of the computer 1, the computer 1 is connected to a communications system and the apparatus 14. However, those skilled in the art will appreciate that the communications system and the apparatus 14 are optional. The computer 1 in accordance with an embodiment of the inventions is operable independently from the networks 8, 10 and the apparatus 14.

Within the illustrated (optional) network 8, 10 voice and data communications occurs via conventional communications links, which may be any of a variety of communications channels which allow transfer of data. Examples for such communications links are twisted pair or coaxial cables or fiber optical connections. For instance, in addition to various analog systems, digital networks may include a T-1 (1.544 Megabits per second) or a T-3 (45 Megabits per second) carrier system, an integrated services digital network (ISDN), Ethernet, Internet Protocol, or the like.

In one embodiment, the computer 1 includes a video processing module 4 which is connected to a buffer 22 and an interface module 6. The video processing module 4 is associated with the video input device 2 and receives video data from the video input device 2. The buffer 22 has a bidirectional connection with the video processing module 4 and is further connected to a storage device 24, typically a hard disc drive.

The exemplary interface module 6 includes several individual interfaces, for example, an interface 7 for message applications (MAPI), an interface 9 for telephony applications (TAPI) 9, an interface 11 for local network applications, and an interface 13 for paging applications. The interface module 6 provides for communications links between the computer 1 and the apparatus 14, and between the computer 1 and the networks 8, 10.

The interface for message applications, hereinafter referred to as the MAPI interface 7 (Messaging Application Programming Interface) is a messaging architecture and a user interface component for applications such as electronic mail (e-mail), scheduling, calendaring and document management. As a messaging architecture, the MAPI interface 7 provides a consistent interface for multiple application programs to interact with multiple messaging systems across a variety of hardware platforms. The MAPI interface 7 provides programming interfaces used by the user applications and any service providers.

Messages from the multiple messaging systems can be delivered to a single "universal inbox". The MAPI interface 7 is built into versions of Windows 95, Windows 98 and Windows NT. The programming interface and subsystem contained in the MAPI dynamic link library (DLL) provide objects which conform to a known component object model. The MAPI interface 7 includes standard messaging client applications that demonstrate different levels of messaging support. In other embodiments of the interface module 6, the interface module 6 can include a message interface that is adapted to other message protocols or communications standards.

The interface for telephony application, hereinafter referred to as the TAPI interface 9 (Telephone Application Program Interface), is a Windows 95 application program interface enabling hardware independent access to telephone based communication. The TAPI interface 9 covers a wide area of services from initializing the equipment (e.g., a modem) and placing a call to voice mail system or controlling a remote computer. Similar to the MAPI interface 7, the TAPI interface 9 can be substituted by an interface that is adapted to other telephony protocols and communications standards.

The interface module 6 includes one or more application specific drivers, for example, modem drivers, network adapter drivers, and terminal adapter drivers. It is contemplated that the interface module 6 can be configured according to the requirements of a specific user. That is, some of these individual interfaces are optional. Furthermore, it is contemplated that the individual interfaces can interact with each other. For example, the MAPI interface 7 can interact with the TAPI interface 9 to send messages over the PSTN 10 and to receive messages therefrom.

The video input device 2 can either be connected to the computer 1 or integrated into the computer 1 as described above. The video input device 2 can be any image source, such as one of many types of video cameras, such as digital cameras, desktop video cameras, video camcorders, parallel-port cameras, handycams, and universal serial-bus (USB) cameras. Hereinafter, the video input device 2 is referred to as the video camera 2. Some type of video input devices may require video capture electronics (video capture device 19 in FIG. 2) which are contained on a single video card within the computer 1. An exemplary video card includes an integrated circuit 848 available from Brooktree.

Figure 2:
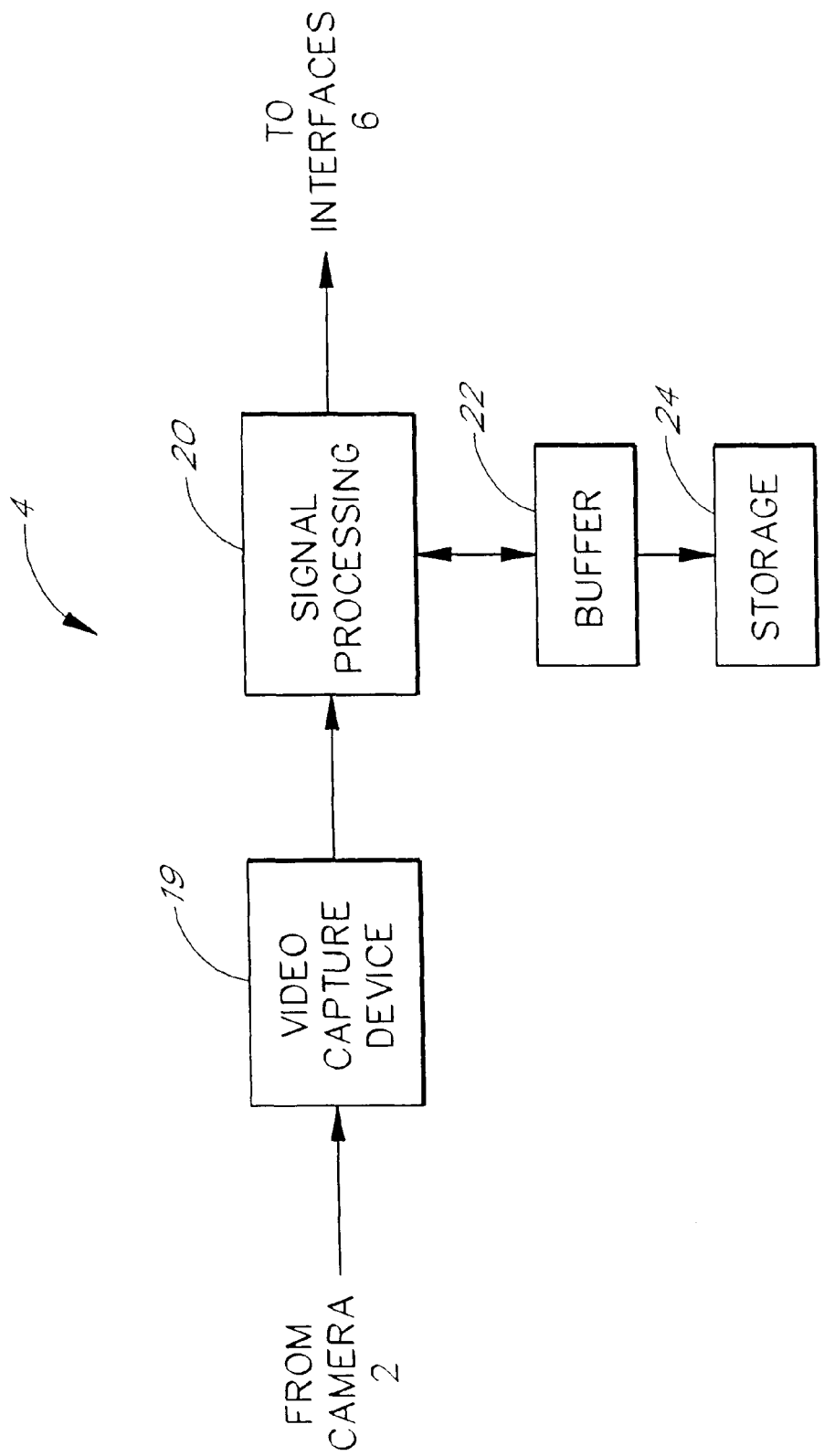
FIG. 2 is a block diagram of the computer system.

FIG. 2 is a block diagram of the video processing device 4 connected to the video camera 2, the buffer 22 and the interface module 6. The video processing device 4 includes a video capture device 19 and a signal processing module 20. The video capture device 19 is connected to the video camera 2 and the signal processing module 20. The signal processing module 20 is connected to the interface module 6.

In one embodiment, the video capture device 19 encodes and compresses video data originating from the video camera 2. It is contemplated that in one embodiment video data can be encoded in an encoder separate from the video capture device 19. In other embodiments, the encoding may be performed by the camera 2. The video capture device 19 uses an encoding scheme to encode and to compress the video data. The encoding scheme is based on public standards defined by the Moving Pictures Experts Group (MPEG) of the International Organization of Standards (ISO), which released standards such as MPEG-1 and MPEG-2. Similar standards such as the H.263 standard are released by the International Telecommunications Union (ITU). These standards provide an efficient way to represent image sequences in the form of compact coded data.

In one embodiment, the computer 1 uses an H.263 encoder. The video capture device 19 is hereinafter referred to as the encoder 19. However, it is contemplated that other standards such as MPEG-2, H.262 or new generations of these standards can be used. Hereinafter, a short overview of the H.263 standard is given as far as it is considered to be helpful for understanding the present invention. For a detailed description, however, reference is made to the complete H.263 standard from the ITU.

The H.263 standard is used for video conferencing applications. Basic building components of a coded picture are blocks and macroblocks. Blocks and macroblocks are extracted from an input picture such as a frame of video data. The encoder 19 compares the macroblocks in a frame with macroblocks from previous frames.

The encoder 19 uses either intra or inter encoding techniques to encode the macroblocks. Intra techniques compress a picture using information from that picture. Inter techniques compress a picture using information from other pictures displaced in time. Thus, an intra-frame has intra encoded macroblocks that rely on information existing within the frame. An inter-frame has one or more inter encoded macroblocks that rely on information from other pictures. Additionally, according to the H.263 specification, the encoder 19 generates an intra-frame if an intra-frame has not been generated in the last 132 frames.

The encoder 19 outputs encoded video data. The encoded video data varies in part based on the amount of motion in the field of view of the video camera 2. The signal processing device 20 processes the encoded video data in order to determine if any motion occurred in front of the camera 2, and if this motion is above a user-defined threshold for "no motion." Generally, more motion results in bigger inter-frames, and less motion results in smaller inter-frames. In one embodiment of the signal processing device 20, the size (length) of an inter-frame is evaluated. The size of an inter-frame corresponds, for example, directly to the number of bytes within an inter-frame.

While one embodiment processes encoded inter-frames, it is contemplated that other embodiments can process a wide range of video segments to determine whether motion exists in a viewing area. The video segments may include blocks of video data, macroblocks of video data, frames of video data, encrypted video data, code video data, compressed video data and the like.

The signal processing device 20 communicates with the buffer 22 via a bidirectional data link. Thus, under certain circumstances, the signal processing module 20 can write video data to the buffer 22 and read video data from the buffer 22. The buffer 22 includes "old" data while "new" data is being added.

In one embodiment, the buffer 22 is a circular buffer having a storage capacity of about 4096 bytes to record approximately 45 seconds. In other embodiments, the storage capacity can vary to record video clips of different lengths. Alternatively, the buffer 22 can be a first in, first out (FIFO) memory, or a storage organized similar to a shift register in which data is shifted serially after each clock cycle. In another embodiment, the buffer 22 can be a pointer-based buffer. The pointer points to the next available storage cell. Under certain circumstances, the data in the buffer 22 is transferred to the storage device 24.

In one embodiment, the storage device 24 is accessible by the computer 1. While the storage device 24 is typically a hard disk, the storage device 24 may comprise any method or device for storing information. For example, the storage device 24 may comprise random access memory (RAM), floppy disks, laser disc players, digital video devices, compact discs, video tapes, audio tapes, magnetic recording tracks, and other techniques that store data.

Figure 3:
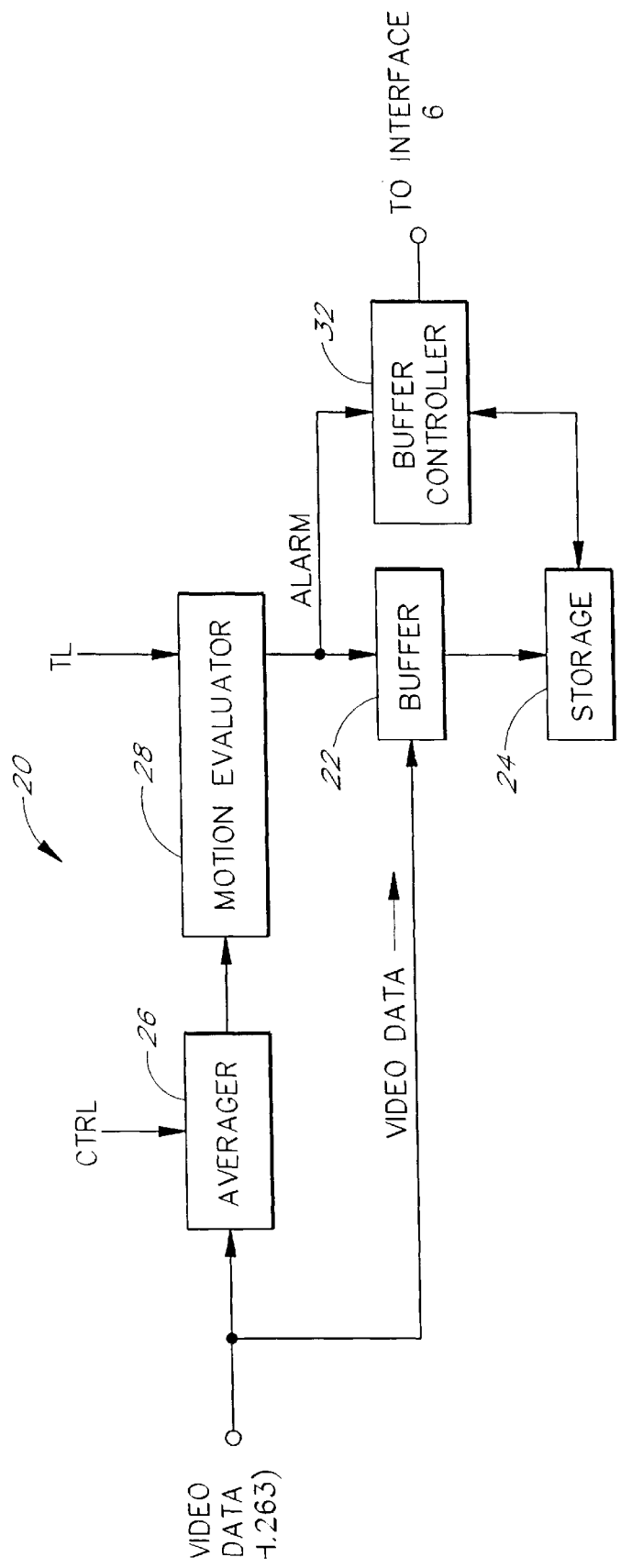
FIG. 3 is a block diagram of a signal processing module included in the computer system of FIG. 2.

FIG. 3 shows a block diagram of the signal processing module 20, and, for illustrative purposes, the buffer 22 and the storage 24. The signal processing module 20 includes a module 26 which computes a value for the average length of the variable length codes received from the encoder 19. Hereinafter, the module 26 is referred to as the averager 26. The averager 26 receives a control signal CTRL, which defines filter coefficients. The averager relies on these filter coefficients to compute the average value. The computation of the average value is described in greater detail below in connection with FIGS. 5–7.

In one embodiment, the signal processing module 20 includes a module 28 to determine if any motion has been detected. Hereinafter, the module 28 is referred to as the motion evaluator 28. The motion evaluator 28 is connected to the averager 26 to receive the average value calculated by the averager 26. The motion evaluator 28 receives a control signal TL. The control signal TL represents a threshold value above which the motion evaluator 28 indicates that sufficient motion is present in the field of view of the camera 2.

The motion evaluator 28 is connected to the buffer 22 and to a buffer controller 32. The buffer controller 32 is connected to the interface module 6 and the storage 24. As shown in FIG. 3, the buffer 22 is further directly connected to the encoder 19 to receive and store the encoded video data. Because of the limited storage capacity of the buffer 22, the video data in the buffer 22 includes more recent video segments.

The motion evaluator 28 generates an ALARM signal when there is sufficient motion in front of the camera 2. That is, the ALARM signal is generated when the average value exceeds the threshold value. The threshold value determines the sensitivity for the motion detection so that the user individually can define what "no motion" looks like. The motion evaluator 28 typically does not generate an alarm if low random environmental motion occurs. For example, clouds floating by outside a window, shadows or the like should not cause an alarm. By means of the threshold value, the motion evaluator 28 "knows" what no motion looks like. The ALARM signal is input to the buffer 22 and the buffer controller 32.

Upon receipt of the ALARM signal, the buffer controller 32 initiates a transfer of data. The buffer 22 continues to record the encoded video data after the ALARM signal. In one embodiment, the buffer controller 32 then transfers video data representing a video clip. The video clip includes a first period of time before the ALARM signal and a second period of time after the ALARM signal.

In one embodiment, the first period of time before the ALARM signal corresponds to about one third of the content of the buffer 22. The second period of time after the ALARM signal corresponds to about two thirds of the buffer's content. An example of a default setting for the length of the video clip is 30 seconds. In this case, the video clip includes 10 seconds before the ALARM signal and 20 seconds after the ALARM signal, i.e., the first 20 seconds of an intrusion. However, in other embodiments, the amount of buffer space dedicated to the first and second periods of time may vary.

In one embodiment, the user can define where the video data, i.e., the video clip, is to be transferred after the ALARM signal. In some cases, the video data will be transferred to the storage 24. Because the video clip is transferred to the storage 24 and stored thereon, the user can watch the video clip as soon as the user returns to the computer 1. The user can watch the stored video clip and see what was going on immediately before the ALARM signal was generated, and for a certain period of time after the ALARM signal was generated.

The video clip may also be transferred to the interface module 6 for further processing. This further processing includes determining whether a telephone message, an e-mail or a local acoustic alarm needs to be executed automatically. The e-mail may include a text message, the video clip or some combination thereof. An e-mail including the video clip is referred to as a video e-mail.

Figure 4:
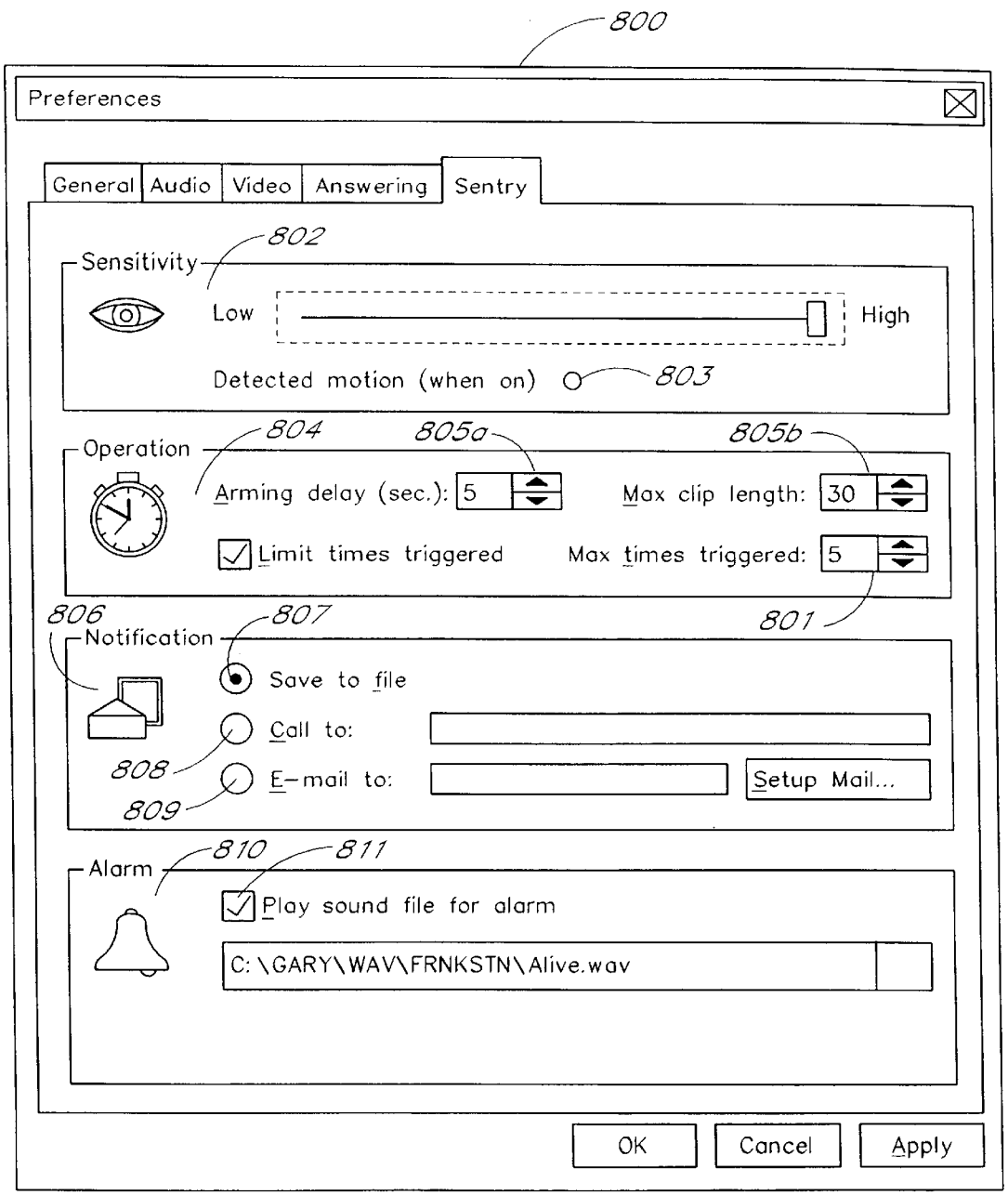
FIG. 4 is an overview of a graphical user interface.

By means of a graphical user interface (GUI) the user can set the computer system and define how the computer system should react upon generation of the ALARM signal. FIG. 4 shows an exemplary GUI 800 to illustrate several options the user has. In one embodiment, the GUI 800 has four fields which the user can define. In a field 802, the user can set a level of sensitivity between "Low" and "High." The user subjectively adjusts the sensitivity level of the computer system. In case the user selects a relatively high sensitivity level, minute motion in front of the camera 2 is sufficient to cause an alarm. While adjusting the sensitivity level, the user can observe an indicator 803 which goes on when the motion is above the present sensitivity level.

In a field 804, the user can define several parameters for the operation of the computer system. For instance, the user can set a timer 805a to define a delay time (in seconds). In the illustrated embodiment, the alarm procedure "waits" for 5 seconds before the alarm procedure is triggered and executed. The delay time allows the user to leave the field of view in front of the camera 2 without triggering the alarm procedure. In addition, the user can set a recording timer 805b which determines the length of a video clip. In the illustrated embodiment, the recording timer 805b is set to 30 seconds.

In field 804, the user can further set a trigger counter 801 to define how often the alarm procedure can be triggered. After each executed alarm procedure which generated a video clip, the alarm procedure is reset and enabled to trigger the next alarm procedure. For example, in an office application, the user can record each intrusion into the office while the user was gone.

In a field 806, the user can select one or more options defining the mode of notification after an ALARM signal has been generated. For example, in an office environment, the user may choose the option 807, "Save to File," which stores the video clip on the storage 24. The user can play the video clip when he returns to his office. This allows him to determine who was looking for him while he was away from his desk. In the example of a working parent, the user may choose the options 808, "Call to," or 809, "E-mail to" to receive an automatic notification that the children have safely returned home from school. The user can define the desired telephone number and the e-mail address. In the illustrated embodiment, the notification can be an automatic voice message, a text-only e-mail or a video e-mail.

In a field 810, the user can additionally define if an acoustic alarm should be generated within his office, home, building, or at a remote location. In the illustrated embodiment, the user selected a sound file 811, which is to be played upon an alarm.

Figure 5:
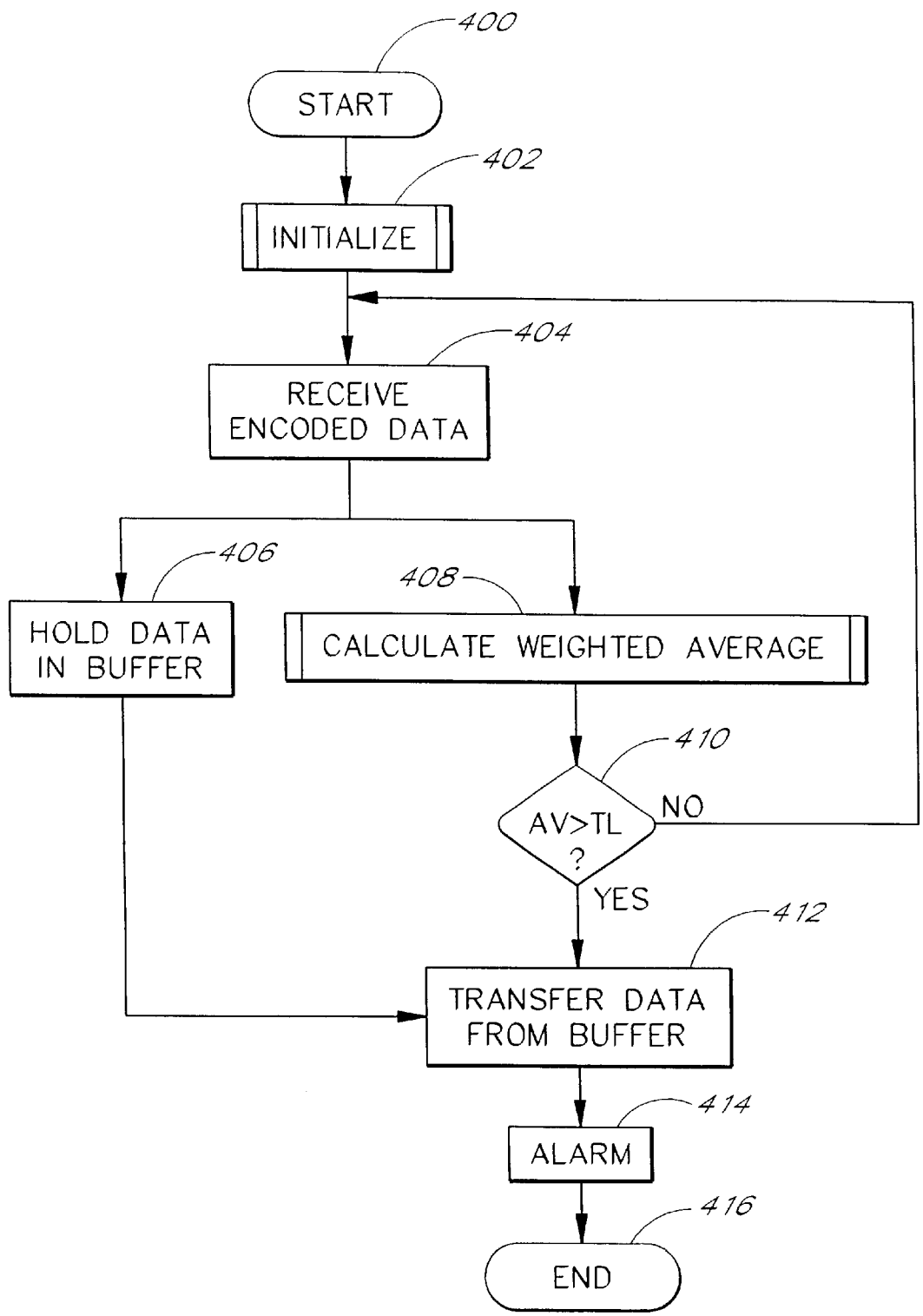
FIG. 5 is a flow diagram illustrating a procedure for detecting motion with the computer system.

FIG. 5 is an exemplary flow diagram illustrating the alarm procedure of the computer 1 within the computer system. It is contemplated that the alarm procedure is implemented in a conventional programming language, such as C or C++. The alarm procedure and the software necessary to install it is on a computer accessible storage medium. The computer accessible storage medium may comprise any method of storing information. For example, the storage medium may comprise random access memory (RAM), hard discs, floppy disks, laser disc players, digital video devices, compact discs, video discs, video tapes, audio tapes, magnetic recording tracks, and the like.

The alarm procedure is initialized when the computer 1 and the video camera are activated ("running") as indicated by a start block 400. Proceeding to block 402, the alarm procedure initializes the video alarm system. For example, the procedure verifies if the video camera 2 is properly operating, and if the optional communications links are established. In addition, the user can define parameters such as the sensitivity level, and the length of the video clip.

Figure 6:
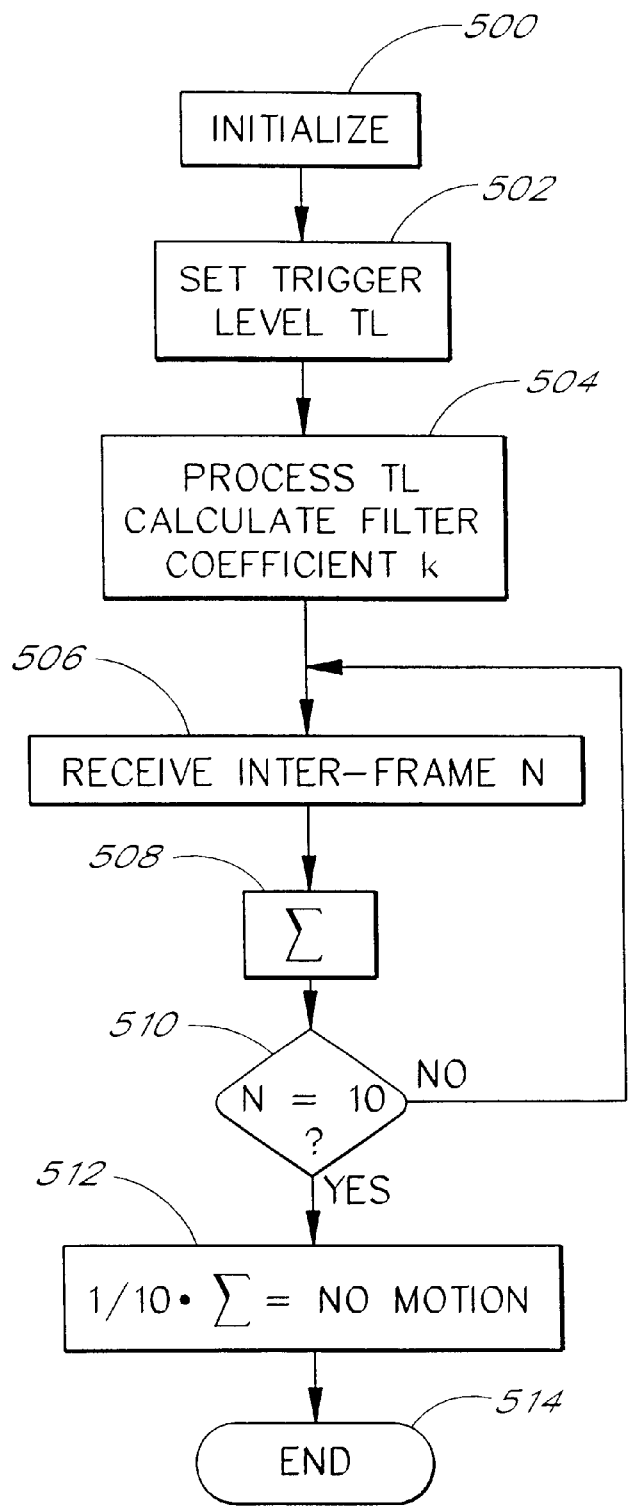
FIG. 6 is a flow diagram illustrating a procedure for determining "no motion."

Proceeding to block 404, if the video camera 2 and the communications links are operating properly, the video alarm system starts receiving the encoded video data from the video camera 2 on a frame-by-frame basis. Hereinafter, the encoded video data is referred to as the encoded data. In one embodiment, the alarm procedure uses the first incoming frames of the encoded data to determine a "no motion" state. That is, the alarm procedure determines what "no motion" looks like. As described above, the user sets the sensitivity level, which is used in block 402 to determine if motion has been detected. An example of a sub-procedure "INITIALIZE" to determine the "no motion" state is illustrated in FIG. 6 and described below.

The blocks 402, 404 are shown as two consecutive blocks for illustrative purposes. It is contemplated that the video alarm system is initialized by using the received encoded data. Furthermore, the blocks 402, 404 could either be combined or their order could be reversed.

Proceeding to block 406, the buffer 22 receives the encoded data as an input signal. The buffer 22 stores (holds) the "newest" encoded data and drops the "oldest" encoded data. The content of the buffer 22 represents the field of view in front of the camera 2. Further treatment of the content of the buffer 22 depends upon whether or not the alarm procedure generates an alarm as described below.

Figure 7:
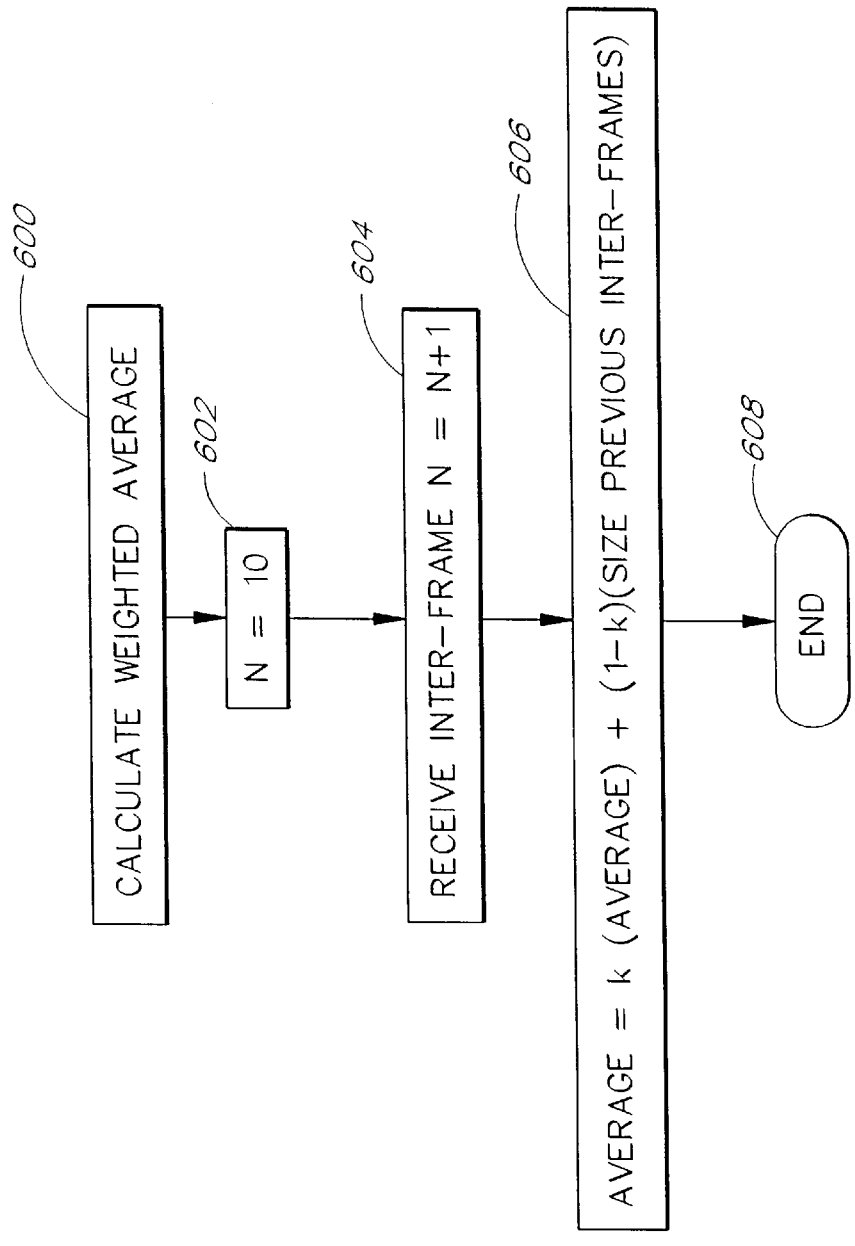
FIG. 7 is a flow diagram illustrating a procedure for calculating a motion parameter.

Proceeding to block 408, the averager 26 receives the encoded data as an input signal parallel to the block 408. That is, the encoded data is input to the buffer 22 and the averager 26. The averager 26 uses the encoded data to calculate a value for the weighted average (the "average value AV") of the size of the frames. An example of a sub-procedure to calculate the weighted average (CALCULATE WEIGHTED AVERAGE) is shown in FIG. 7 and described below.

Proceeding to block 410, the motion evaluator 28 compares the average value AV with the threshold value TL which defines the sensitivity level of the video alarm system. In one embodiment, the threshold value TL is multiplied by a factor of, for example, 300 and increased by, for example, 500 to adjust the unit-less threshold value so that it may be compared with the average frame size, which is expressed in units of, for example, bytes. These values can be determined empirically. In this case, the average value is compared with the adjusted threshold value. If the average value AV is below the threshold value TL, the alarm procedure returns along the NO branch to block 404. If case the average value AV is above the threshold value TL, the alarm procedure proceeds along the YES branch to block 412. In this case, the motion evaluator 28 generates the ALARM signal indicating that there is more motion in front of the video camera 2 than in the "no motion" state.

Proceeding to block 412, the alarm procedure continues to record the video clip for a predetermined period of time and then starts transferring the encoded data from the buffer 2. In some cases, the transfer of the encoded data includes a transfer to the storage 24. However, depending on the user-defined settings of the video alarm system, the encoded data can also be transferred to the interface module 6 as described above.

Proceeding to block 414, following the transfer of the encoded data, the alarm procedure generates a user-defined notification or ALARM. For instance, the interface module 6 can perform sub-procedures to execute the desired notification. The desired notification includes sending a textual e-mail, a video e-mail, initiating an automatic call or an acoustic alarm as described above. Proceeding to block 416, the alarm procedure ends.

FIG. 6 shows an exemplary flow diagram of the sub-procedure "INITIALIZE" of FIG. 5 to determine the "no motion" state. Starting at block 500, the sub-procedure is reset and initialized. Proceeding to block 502, the user can set the threshold value TL, which is in one embodiment an integer between 1 and 99.

Proceeding to block 504, the sub-procedure processes the threshold value TL to compute a digital filter coefficient k. The sub-procedure implements a method known as an exponential averaging filter. For the equation:

AVERAGE=$k$(AVERAGE)+(1−$k$)(SIZE OF PREVIOUS INTER-FRAME).

The filter coefficient k can be the maximum value of either 1) a minimum value $k_{min}$ for the filter coefficient k or 2) an adjusted threshold value. The value $k_{min}$ varies based on the number of encoded inter-frames. In one embodiment, if the total number of encoded (trigger) frames is below 10, the minimum value $k_{min}$ for the filter coefficient k is 0.99. If the number of encoded (trigger) frames is 10 or above, the minimum value $k_{min}$ for the filter coefficient k is in one embodiment 0.8. In another embodiment, the minimum value $k_{min}$ for the filter coefficient k can be 0.75.

The sub-procedure compares $k_{min}$ with an adjusted threshold value TL to determine which value is larger. The sub-procedure arrives at the adjusted threshold value by, for example, dividing the user-specified threshold value TL by a constant value of 1000 and adding 0.8. In another embodiment, the user-specified threshold value TL can be divided by 100 or some other number so as to adjust the threshold value so that it is comparable to the minimum value $k_{min}$. The filter coefficient k is then the maximum value of either the minimum value $k_{min}$ or the adjusted threshold value. Since the user-specified threshold value TL ranges from 1 to 99, the adjusted threshold value typically ranges from 0.801 to 0.899.

Proceeding to block 506, the sub-procedure receives the first inter-frame (N=1) and determines the size (length) of the first inter-frame. As discussed above, in one embodiment, the inter-frames are received on a frame-by-frame basis. Proceeding to block 506, the sub-procedure adds the size of the first inter-frame to an initial value, for example, zero, and generates a sum value. An integer N represents the number of the received inter-frames.

Proceeding to block 510, the sub-procedure determines if ten inter-frames (N=10) have been received and added. If less than ten inter-frames have been added, the sub-procedure returns along the NO branch to block 506. If ten inter-frames have been added, the sub-procedure proceeds along the YES branch to block 512.

Proceeding to block 512, the sub-procedure divides the sum value by 10 to determine the average size of the first ten frames. This average size represents the "no motion" state within the present field of view in front of the camera 2. The sub-procedure ends at block 514.

FIG. 7 is an exemplary flow diagram illustrating the sub-procedure "CALCULATE WEIGHTED AVERAGE" of FIG. 5 to calculate the value for the weighted average of the size of the frames. While the illustrated embodiment calculates a weighted average, it is contemplated that other embodiments calculate an average or a sum of the video segments.

Starting at block 600, the sub-procedure is initialized. Proceeding to block 602, the average size of the first ten frames (N=10) is determined which represents the "no motion" state. Proceeding to block 604, the sub-procedure receives inter-frames. When the sub-procedure receives an inter-frame, a counter for the integer N is increased (N=N+1) after each frame. Proceeding to block 606, sub-procedure calculates the weighted average of the size of the inter-frames. The sub-procedure weights the size of each new inter-frame lower than the average size of all the previous inter-frames. However, since the average size of the previous inter-frames takes into consideration all of the previous inter-frames and the size of a new inter-frame represents only a single inter-frame, this places greater emphasis on the new inter-frame.

The sub-procedure weights the inter-frames according to the equation:

AVERAGE=$k$(AVERAGE)+(1−$k$)(SIZE OF PREVIOUS INTER-FRAME).

The sub-procedure ends at block 608 and the average value is further processed as explained above with reference to FIG. 5.

Figure 8:
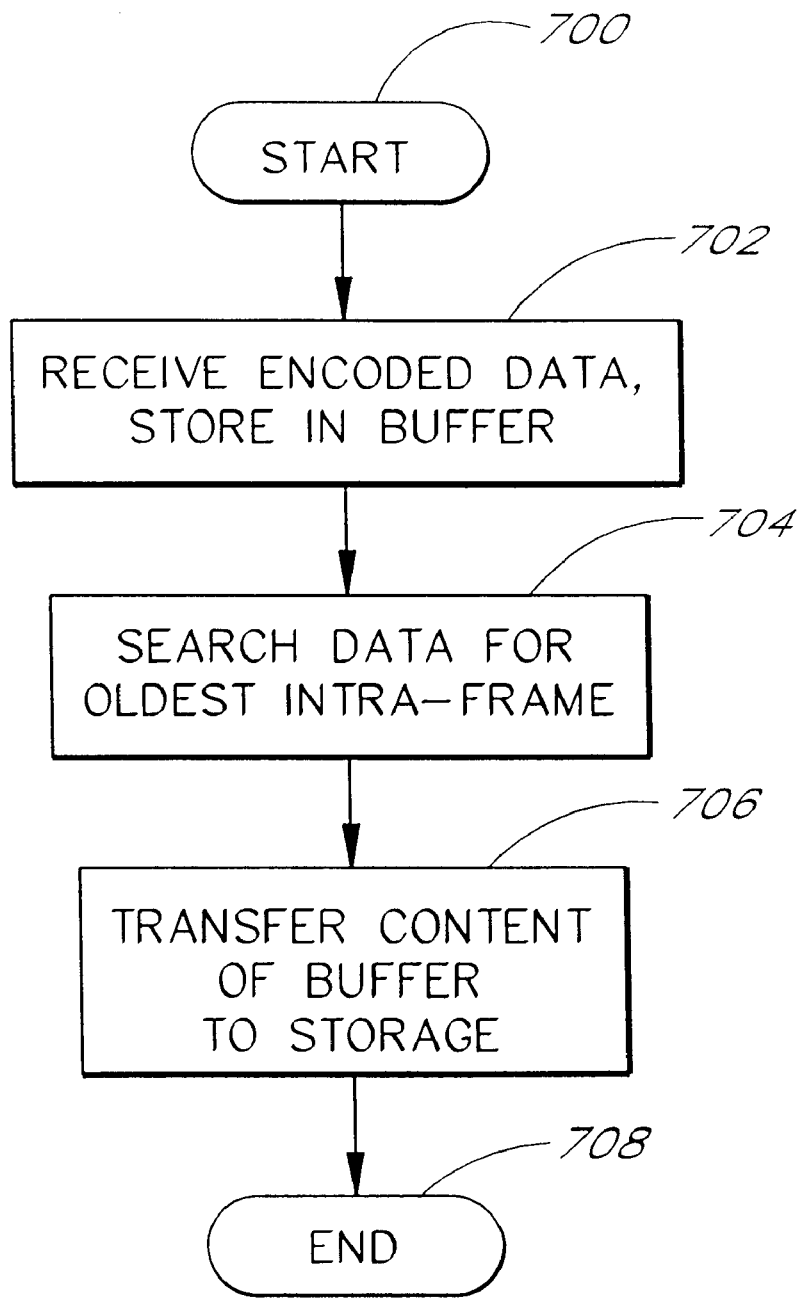
FIG. 8 is a flow diagram illustrating a procedure to transfer data.

FIG. 8 is a flow diagram illustrating a procedure to transfer the encoded data from the buffer 22 after sufficient motion has been detected in front of the camera 2. Starting at block 700, the procedure is initialized. Proceeding to block 702, the procedure prepares for the transfer of the encoded data from the buffer 22. In the illustrated embodiment, the encoded data is transferred to the storage 24.

Proceeding to block 704, upon the receipt of the ALARM signal, the procedure searches for a prior intra-frame in the buffer 22. As discussed above, intra techniques compress a video segment using information from that video segment. In one embodiment, the procedure searches for the "oldest" intra-frame in the buffer 22. In other embodiments, the procedure may search for a prior intra-frame in the buffer 22. The procedure continues to record for a predetermined period of time after the ALARM signal. The content of the buffer 22 represents the video clip, wherein the oldest inter-frame corresponds to the beginning of the recorded video clip.

Proceeding to block 706, the procedure transfers the content of the buffer 22 to the storage device 24. The encoded data is stored within the storage device 24 and available for later use. For example, the user can watch the video clip at a convenient time, as explained above. When the encoded data is transferred, the procedure ends in block 708. Depending on the setting of the trigger counter 801 (FIG. 4), the procedure is either disabled or reset and enabled for the next detected alarms.

In one embodiment of the video alarm system, a conventional computer can be used without requiring additional and mostly expensive hardware. A conventional video camera which may already be connected to the computer can be used and the computer is converted to a security or monitoring system. This system is triggered by motion detected in front of the video camera. Once triggered, the system records a video clip and can trigger an alarm or a notification. Under certain circumstances, the user may desire to connect the system directly to the police or a private security system.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A computer system, comprising:
   a video input device to generate video data representing a field of view in front of the video input device;
   a computer connected to the video input device, the computer comprising:
   a buffer configured to record a video clip of the field of view in front of the video input device; and
   a video processing module connected to the buffer and the video input device, the video processing module comprising a video capture device to encode the video data in consecutive frames of varying size, and a signal processing module, the signal processing module configured to process the encoded video data in order to calculate an average value of the size of the encoded video data, and to generate an alarm signal if the average value exceeds a predetermined threshold value, the alarm signal indicating that sufficient motion has been detected in front of the video input device.

2. The computer system of claim 1, wherein the video processing module further comprises a controller configured to control a transfer of the encoded video data from the buffer upon generation of the alarm signal.

3. The computer system of claim 2, wherein the controller is configured to control the buffer to record the field of view for a predetermined period of time after the alarm signal, the video clip including a first recording before the alarm signal and a second recording after the alarm signal.

4. The computer system of claim 3, wherein the first recording is about one-third of the video clip and the second recording is about two-thirds of the video clip.

5. The computer system of claim 4, further comprising a storage device configured to store the video data transferred from the buffer.

6. The computer system of claim 4, further comprising an interface module configured to connect the computer to an external communications line, the interface module connected to the video processing module.

7. The computer system of claim 6, wherein the signal processing module and the interface module are configured to generate and send a predetermined notification message to the communications line.

8. The computer system of claim 7, wherein the predetermined notification message is an electronic mail message addressed to a predetermined address.

9. The computer system of claim 7, wherein the predetermined notification message is an electronic mail message, including the video clip, addressed to a predetermined address.

10. The computer system of claim 7, wherein the predetermined notification message is a telephone call directed to a predetermined number.

11. The method of claim 4, further comprising the step of generating and sending a predetermined notification message to an external communications line.

12. The method of claim 11, wherein the predetermined notification message is an electronic mail message addressed to a predetermined address.

13. The method of claim 11, wherein the predetermined notification message is an electronic mail message, including the video clip, addressed to a predetermined address.

14. The method of claim 11, wherein the predetermined notification message is a telephone call directed to a predetermined number.

15. A method of detecting motion in a field of view in front of a video input device connected to a computer system, comprising the steps of:
   receiving encoded video data from a video capture device, the encoded video data representing a field of view in front of a video input device, and including frames of variable lengths, the length of a frame depending on motion within the field of view;
   calculating an average value for the variable lengths of the frames;
   comparing the average value with a predetermined threshold value which defines a state of no motion within the field of view; and
   generating an alarm signal if the average value is greater than the predetermined threshold value, the alarm signal indicating that the motion within the field of view is higher than in the state of no motion.

16. The method of claim 15, further comprising the step of storing the encoded video data in a buffer.

17. The method of claim 16, further comprising the step of transferring the encoded video data form the buffer upon generation of the alarm signal.

18. The method of claim 17, wherein the step of storing includes recording the field of view for a predetermined period of time after the alarm signal, the recording creating a video clip including a first recording before the alarm signal and a second recording after the alarm signal.

19. The method of claim 18, wherein the first recording is about one-third of the video clip and the second recording is about two-thirds of the video clip.

20. The method of claim 18, wherein the step of transferring the encoded video data includes transferring the encoded video data to a storage device configured to store the video clip.

21. A motion-detection system that detects motion in a field of view, the motion-detection system configured to process encoded video data from the field of view to determine when sufficient motion exists in the field of view, the motion-detection system comprising:
   a video camera that generates a series of video frames that represent a field of view in front of the video device;
   a video encoder in communication with the video frames, the video encoder configured to process the video frames to generate encoded video frames wherein the size of the encoded video frames vary based on the amount of motion in the field of view; and
   a computer in communication with the encoded video frames, the computer comprising:
      a threshold value stored in a computer accessible storage medium; and
      a processor in communication with the encoded video data and the threshold value, the processor configured to process the encoded video frames to determine a weighted average of at least a portion of the encoded video frames, the processor further configured to detect motion when the weighted average exceeds the threshold value.

22. The system of claim 21 wherein the processor generates a notification message when the processor detects motion.

23. The system of claim 21 wherein the processor is further configured to communicate the notification message to the interface module.

24. The system of claim 22 wherein the interface module is configured to transfer the notification message to a remote location via a communications connection.

25. The system of claim 23 wherein the notification message is an electronic mail message.

26. The system of claim 23 wherein the notification message comprises a portion of the encoded video data.

27. The system of claim 21 further comprising a buffer memory which is configured to store a portion of the encoded video data obtained after to the detection of motion.

28. The system of claim 27 wherein the buffer memory is configured to store a portion of the encoded video data obtained prior to the detection of motion.

29. The system of claim 28 wherein the processor transfers a portion of said encoded video data in the buffer to a computer accessible recording medium.

30. A motion-detection apparatus comprising:
   a series of video segments configured to vary in size based on movement in a field of view; and
   a processor configured to process at least a portion of the video segments to determine an average, the processor further configured to detect motion when the average exceeds a threshold.

31. An article of manufacture comprising a signal processing module stored in a computer accessible storage media and executable in a processor, the signal processing module configured to calculate an average of multiple video segments that vary in size based on movement in a field of view, the signal processing module further configured to detect motion when the average exceeds a threshold.

32. A motion-detection apparatus comprising:
   a series of video segments configured to vary in size based on movement in a field of view; and
   a means for processing at least a portion of the video segments to determine an average, the means also detecting motion when the average exceeds a threshold.

33. A method of detecting motion comprising the acts of:
   generating video data that represent a field of view;
   encoding the video data to generate encoded video segments that vary in size based on the amount of motion in the field of view;
   determining a weighted average of at least a portion of the encoded video segments; and
   detecting motion when the weighted average equals or exceeds a threshold.

34. A method of detecting motion comprising the acts of:
   receiving video segments that vary in size based on movements in a field of view;
   calculating an average of at least a portion of the video segments; and
   detecting motion when the average exceeds a threshold.

35. A motion-detection system that transfers video segments stored in a buffer to a computer accessible storage medium when motion is detected in a field of view, the motion-detection system comprising:
   a video camera with a field of view, the video camera configured to generate video data about the field of view;
   a video encoder configured to process the video data to generate video segments that vary in size based on the amount of motion in the field of view;

a buffer which stores a portion of the video segments occurring prior to a detection of motion and a portion of the video segments occurring after the detection of motion; and a processor configured to locate in the buffer the oldest encrypted video segment which independently defines an image within the field of view, the processor further configured to transfer the oldest encrypted video segment and subsequent encrypted video segments from the buffer to a computer accessible storage medium.

36. A motion-detection apparatus comprising:

a buffer that stores video segments which vary in size based on movement in a field of view; and a processor that is configured to locate in the buffer a prior video segment occurring before the detection of motion, the processor further configured to transfer the prior video segment and subsequent video segments from the buffer to a computer accessible storage medium.

37. A motion-detection apparatus comprising:

a first means for temporarily storing video segments which vary in size based on movement in a field of view; and a second means for locating in the buffer a prior video segment occurring before the detection of motion, the second means transferring the prior video segment and subsequent video segments from the buffer to a computer accessible storage means.

38. An article of manufacture comprising:

a buffer module stored in a computer accessible storage media and executable in a processor, the buffer module configured to temporarily store video segments which vary in size based on movement in a field of view; and a signal processing module stored in a computer accessible storage media and executable in a processor, the signal processing module configured to locate in the buffer module a prior video segment occurring before the detection of motion, the processor further configured to transfer the prior video segment and subsequent video segments from the buffer to a computer accessible storage medium.

39. A method of detecting motion comprising the acts of:

generating video data that represent a field of view;

encoding the video data to generate encoded video segments that vary in size based on the amount of motion in the field of view;

storing in a buffer, at least a portion of the video segments occurring prior to a detection of motion and at least a portion of the video segments occurring after the detection of motion;

locating in the buffer the oldest encrypted video segment which independently defines an image within the field of view; and transferring the oldest encrypted video segment and subsequent encrypted video segments from the buffer to a computer accessible storage medium.

40. A method of storing video data comprising the acts of:

storing in a buffer, video segments which vary in size based on movement in a field of view;

locating in the buffer a prior video segment occurring before the detection of motion; and transferring the prior video segment and subsequent video segments from the buffer to a computer accessible storage medium.

* * * * *